US007962614B2

(12) United States Patent
Kaplan (10) Patent No.: US 7,962,614 B2
(45) Date of Patent: *Jun. 14, 2011

(54) SYSTEM AND METHOD FOR FORECASTING INFORMATION USING COLLECTIVE INTELLIGENCE FROM DIVERSE SOURCES

(75) Inventor: Craig A. Kaplan, Aptos, CA (US)

(73) Assignee: Predictwallstreet, LLC, Capitola, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/564,849

(22) Filed: Sep. 22, 2009

(65) Prior Publication Data

US 2010/0185493 A1 Jul. 22, 2010

Related U.S. Application Data

(60) Continuation of application No. 11/641,548, filed on Dec. 18, 2006, now Pat. No. 7,627,673, which is a division of application No. 10/107,420, filed on Mar. 26, 2002, now Pat. No. 7,155,510.

(51) Int. Cl.
*G06F 15/173* (2006.01)

(52) U.S. Cl. ........ 709/224; 709/227; 709/228; 709/238; 715/507

(58) Field of Classification Search .................. 709/203, 709/224, 227, 228; 707/101
See application file for complete search history.

(56) References Cited

U.S. PATENT DOCUMENTS

| | | | |
|---|---|---|---|
| 4,713,775 A | 12/1987 | Scott et al. | |
| 4,745,468 A | 5/1988 | Von Kohorn | |
| 4,872,122 A | 10/1989 | Altschuler et al. | |
| 5,774,656 A | 6/1998 | Hattori et al. | |
| 5,862,223 A | 1/1999 | Walker et al. | |
| 5,875,108 A | 2/1999 | Hoffberg et al. | |
| 6,094,674 A | 7/2000 | Hattori et al. | |
| 6,223,165 B1 | 4/2001 | Lauffer | |
| 6,366,956 B1 | 4/2002 | Krishnan | |
| 6,446,200 B1 * | 9/2002 | Ball et al. | 713/1 |
| 6,539,392 B1 | 3/2003 | Rebane | |
| 7,013,285 B1 | 3/2006 | Rebane | |
| 7,155,510 B1 * | 12/2006 | Kaplan | 709/224 |
| 7,222,190 B2 * | 5/2007 | Klinker et al. | 709/238 |
| 7,350,138 B1 * | 3/2008 | Swaminathan et al. | 715/234 |
| 7,627,673 B2 * | 12/2009 | Kaplan | 709/224 |

OTHER PUBLICATIONS

Co-pending U.S. Appl. No. 11/641,548, filed Dec. 18, 2006.
Co-pending U.S. Appl. No. 10/107,420, filed Mar. 26, 2002.

(Continued)

*Primary Examiner* — Khanh Q Dinh
(74) *Attorney, Agent, or Firm* — Perkins Coie LLP (57) ABSTRACT

System, method, computer program product, and business operating model. Information processing system comprising: server computer having processor for executing computer instructions and memory coupled to processor for storing instructions and data; communications link for communicating between server and information appliance client entities external to server, communication link enabling receipt of first information from a plurality of external entities and for transmitting second information to second entities, first and second entities may be same entities or different entities; data store defining database for storing first and second information; computer program having plurality of executable command instructions and executing in processor and memory for generating second information from at least some of plurality of first information; wherein first information comprising plurality of individual information items and second information comprising processed collective information generated from plurality of individual information items and having increased value to second entities by virtue of collective contribution and processing applied thereto.

12 Claims, 5 Drawing Sheets

Collective Intelligence Processing Algorithms                    Database

OTHER PUBLICATIONS

Notice of Allowance Mailed Jun. 22, 2009 in Co-pending U.S. Appl. No. 11/641,548, filed Dec. 18, 2006.
Notice of Allowance Mailed Aug. 9, 2006 in Co-pending U.S. Appl. No. 10/107,420, filed Mar. 26, 2002.
Non-Final Office Action Mailed Dec. 19, 2008 in Co-pending U.S. Appl. No. 11/641,548, filed Dec. 18, 2006.
Non-Final Office Action Mailed Dec. 16, 2005 in Co-pending U.S. Appl. No. 10/107,420, filed Mar. 26, 2002.

* cited by examiner

FIG. 1

Current Stock Quotes: IBM 94.96   MSFT 54   ORCL 16.06   ARBA 1
Collective Forecasts: IBM 95      MSFT 53   ORCL 16      ARBA 1

FIG. 2

PREDICT WALLSTREET◊

Investment Intelligence for Everyone(TM)

iQ
COMPANY

Welcome ck:    Current Stock Quotes:    Today's price quotes appear
                 Collective Forecasts:    Tomorrow's price estimates

**The Tomorrow Ticker(TM) provides
FREE stock quotes & FREE collective forecasts.**

Please enter up to 10 stock symbols      Symbol Lookup
   IBM     MSFT    ORCL    ARBA    NITE    Go    IFMX                               Clear

Login to participate in our CLICK-DONATION program!
SAVE OUR SHORES gets $.01 for every stock estimate made on this site.

*SAVE
OUR
SHORES*

Trouble viewing the site? Please see our list of supported browsers.
Important: Information on this site does not constitute investment advice!
Home    About iQ    FAQ's / Help    Press Room    Legal Terms    Privacy    Contact    Login
Copyright © 2000 IQ Computer. All rights reserved.

FIG. 3

| | PREDICT WALLSTREET◊ |
|---|---|
| | Investment Intelligence for Everyone(TM) |
| iQ COMPANY | Current Stock Quotes:     IBM 94.96    MSFT 54    ORCL 16.06    ARBA 1 |
| | Collective Forecasts:      Tomorrow's price estimates appear here |

To receive collective forecasts for these stocks, enter your estimate of their closing prices on 3/15/01 at 4pm, EST.
If you are logged in, SOS will receive $.01 for each of your estimates.

The Tomorrow Ticker displays automatic updates every 5 minutes. Use the Refresh button in your browser to force an instant update.

| Stock | Delayed | Your |
|---|---|---|
| Quote | Volume | |
| Estimate | | |
| IBM | $ 94.96 | 14,244,600 |
| MSFT | $ .54 | 45,343,300 |
| ORCL | $ 16.06 | 52,862,100 |
| ARBA | $ 12 | 14,166,600 |
| NITE | $ 15.88 | 1,192,000 |
| IFMX | $ 5.69 | 3,795,700 |
| | Go | Clear |

Home    About iQ    FAQ's / Help    Press Room    Legal Terms    Privacy    Contact    Login Copyright © 2000 IQ Computer. All rights reserved.

FIG. 4

PREDICT WALLSTREET◊

Investment Intelligence for Everyone(TM)

iQ
COMPANY

| | | | | | | | |
|---|---|---|---|---|---|---|---|
| Current Stock Quotes: | IBM 94.96 | MSFT 54 | ORCL 16.06 | ARBA 1 |
| Collective Forecasts: | IBM 95 | MSFT 53 | ORCL 16 | ARBA 1 |

The collective forecasts displayed here do not constitute investment advice or recommendations.

Thank you. If you logged in, SOS received $.01 for each estimate.
Here are your collective forecasts for 3/15/01 at 4pm EST.

The Tomorrow Ticker displays automatic updates every 5 minutes. Use the Refresh button in your browser to force an instant update.

| Stock Quote | Delayed iQ Collective Forecast | Your Estimate |
|---|---|---|
| IBM | $ 94.96 | $ 95 |
| MSFT | $ .54 | $ 53 |
| ORCL | $ 16.06 | $ 16 |
| ARBA | $ 12 | $ 12 |
| NITE | $ 15.88 | $ 15 |
| IFMX | $ 5.69 | $5.5 |
| | Go | Clear |

Home   About iQ   FAQ's / Help   Press Room   Legal Terms   Privacy   Contact   Login
Copyright © 2000 IQ Computer. All rights reserved.

FIG. 5

SYSTEM AND METHOD FOR FORECASTING INFORMATION USING COLLECTIVE INTELLIGENCE FROM DIVERSE SOURCES

RELATED APPLICATIONS

This application is a continuation of U.S. application Ser. No. 11/641,548, filed Dec. 18, 2006, which is a divisional of U.S. Pat. No. 7,155,510, issued Dec. 26, 2006, which claims the benefit of priority to U.S. Provisional Patent Application Ser. No. 60/279,242, filed Mar. 28, 2001 and entitled Tomorrow ticker: a system for using collective intelligence to forecast future values of financial or other quantifiable information, which applications are hereby incorporated by reference.

BACKGROUND

Heretofore, conventional wisdom has held that it is impossible to predict the stock market with any degree of accuracy. The same conventional wisdom has also been directed to other financial and economic markets and institutions albeit perhaps to a lesser degree.

Yet despite such conventional wisdom many other people have tried to develop mathematical models that predict stock market behavior. What almost all of these other mathematical models have in common is that they are based on economic inputs—interest rates, assumptions about supply and demand, the expansion of the economy, and the like economic factors and indicators. Many of these models are tuned and validated against actual past historical data, and then are used to try to predict future data or behavior. Unfortunately, no known model of this type has worked sufficiently well to overturn the general opinion that the stock market cannot be predicted with any useful degree of accuracy. And, in particular no known conventional model has permitted stock market prediction in a time frame that permits stock market trading decisions to be usefully made based on such predictions.

Besides the people using mathematical models to predict the stock market, there are also mutual fund managers, analysts, brokers, day-traders, and other financial services professionals, who make their living (or try to make a living) by trying to make accurate judgments about what the market is doing or about to do. That most of these professionals are not very accurate, is perhaps best illustrated by the observation that just buying the Standard & Poors (S&P) 500 would allow an investor to outperform 80% of these professional money managers and financial advisors. In fact, the Wall Street Journal and other newspapers have great fun with contests that pit the "dartboard" (random stock picks) against the top analysts—illustrating that the professionals are often worse than random chance at picking stocks.

Another approach is to provide a website that solicits the stock picks of individual investors. The websites rate these individual investors based on their performance picking stocks on the website, much the same way the newspapers have rated analysts. These sites are attempting to discover new experts among the masses of everyday investors. These sites are not directed to predicting particular stock values at particular times and are more nearly directed to longer term performance picks.

Other websites and models and methods associated with such websites have expert analysts on staff who sort through the information generated by the masses, and try to find nuggets that help drive investment decisions. These sites are attempting to leverage the information gathering capabilities of Internet users to do the research for their own in-house experts.

Both web-based approaches rely on conventional wisdom, which says that individual experts (either in-house experts or experts that have been rated by the website) but not ordinary non-expert investors are the key to making good investment decisions. Although use of the Internet makes the approaches seem to be high technology approaches, really the paradigm is an old one: experts will make the best guesses.

The idea that the collective intelligence of many individual investors could outperform the experts has not heretofore been considered as it seemed counter-intuitive to most investment professionals. For example, recently a stock trader with twenty years experience and a seat on a major exchange opined that using the collective wisdom of many investors did not seem like a fruitful approach to forecasting stock prices. His reasoning was that if many people believed something, this belief was probably already factored into the prices and you couldn't make money by acting on what lots of people believed.

The current conventional wisdom when it comes to forecasting stock prices can pretty much be summarized by the following two themes: (i) it probably can't be done reliably, and (ii) if it can be done at all, it requires specialized experts. The current state of forecasting technology reflects this wisdom where attempts are made to identify and utilize one or a small group of experts, but none of these systems do very well compared to chance.

SUMMARY

In one particular embodiment, the invention provides an information processing system comprising: a server computer having a processor for executing computer instructions and a memory coupled to the processor for storing instructions and data during the processing; a communications link for communicating between the server computer and information appliance client entities external to the server computer, the communication link enabling receipt of first information from a plurality of external entities and for transmitting second information to second entities, the first and second entities may be the same entities or different entities; a data store defining a database for storing the first information and the second information; a computer program having a plurality of executable command instructions and executing in the processor and the memory for generating the second information from at least some of the plurality of the first information; wherein the first information comprising a plurality of individual information items and the second information comprising a processed collective information generated from the plurality of individual information items and having an increased value to the second entities by virtue of the collective contribution and processing applied thereto.

In another particular embodiment, the invention provides a method of generating a collective information for a particular item from a plurality of raw information for that same item, the method comprising: gathering raw information from a plurality of first entities for a particular item; processing the plurality of raw information or informations for the particular item to generate a processed collective information for the item; and communicating the processed collective information to second entities.

In another aspect, the inventive method is implemented as a computer software program executing on one or more computers or information appliances, such as for example on a conventional server computer serving content and providing information or data to client computers or devices over an Internet network connection. In such situations, the invention provides a computer program and computer program product for use in conjunction with a computer system, the computer program product comprising a computer readable storage medium and a computer program mechanism embedded therein, the computer program mechanism, including a program module that directs the computer to function in a specified manner, the program module including instructions for generating a collective information for a particular item from a plurality of raw information for that same item, by gathering raw information from a plurality of first entities for a particular item, processing the plurality of raw information or informations for the particular item to generate a processed collective information for the item, and communicating the processed collective information to second entities.

In another aspect, the invention provides various business methods and operating models.

DETAILED DESCRIPTION OF EMBODIMENTS

In one aspect, the inventive system, method, computer program and computer program product takes a unique and novel approach to the problem of quantitative forecasting, including financial forecasting such as predicting movements in stock prices. The approach is based on the collective intelligence of many individual investors, rather than on the intelligence of any one expert or group of recognized experts. And contrary to other approaches based on human intelligence which, if they have any success at all, tend to be successful at predicting long term trends, the inventive approach can predict short or long term stock movements on a real-time basis—much the same way the market itself moves.

It is useful to consider some of the probable objections to this approach by those who follow conventional doctrines, that is some of the reasons conventional wisdom would suggest this approach shouldn't work. These anticipated objections suggest reasons why such an approach has not heretofore been considered. First, there is the supposition that market fluctuations are inherently random and that no one can predict what the market will do next; and, if they could, someone would have already done it. Furthermore, it is supposed that the best that is possible is to predict long-term trends, and even then it is matter for experts.

Second, individuals don't know much about the market and will be just guessing randomly. Since the inputs from non-experts are considered by many to be merely guesses, such an approach would represent a guesses-in-guesses-out scenario, so that such a system and method would not be expected to be capable of predicting anything with accuracy.

Third, even if people did know anything about the stock market, they would not share it with others, and possibly would rather put false information into the system in order to manipulate the system's predictions to their own financial advantage.

Fourth, there is the supposition that any information that people might have, they have already acted on, so that their predictions are already reflected in the options market, which is actually a record of the predictions that people have already made that they are willing to back up with money.

Empirical evidence based on initial prototype testing suggests that these supposed problems do not exist or at least do not exist to the detriment of the inventive system and method. These prototype tests (See Experimental Data section) indicate that a reliable forecasting invention can be built, that it can work with the collective intelligence of ordinary investors having average knowledge and does not require experts.

Although the various embodiments and operational examples described herein are directed to system and method for predicting or forecasting stock prices, it will be appreciated by those having ordinary skill in the art in light of the description provided herein that the principles and the invention described can be used for forecasting future values of almost any quantitative information. As long as many people have knowledge that relates well to the values being forecast, the inventive system and method are applicable.

For example, the invention can be easily applied to forecasting a wide range of values related to human behavior including financial information for markets of all kinds (bonds, stocks, government securities, commodity futures, etc.). But the invention can also be applied to forecasting of sports scores, political elections, or future events of any kind that can be quantified and for which many people possess relevant knowledge.

The invention provides system, method, computer program, and computer program product for generating quantitative forecasts, based on the collective intelligence or data input of many individuals or other entities. Other entities" includes all sources whether human or not. For example, entities refers to the fact that the inventive system and method may incorporate predictions from non-human agents as well as from human agents. Such inputs may include inputs from a computerized software agent that is capable of making (hopefully accurate) quantitative forecasts, this computerize agent may be treated by the inventive system and method in the same way as a human agent or the manner in which its inputs are handled may be modified to take into account any particular characteristics of such computerized agent. In one embodiment, various factual data may also be utilized, such as for example public or proprietary financial or economic data. In general then it will be appreciated that the input from zero or more computerized agents or other non-human entities may be combined with zero or more human agents using the methods of the invention to produce a more accurate collective forecast. This quantitative forecasts find particular application to forecasting financial information such as stock and bond prices, stock index values, interest rates, international currencies, gold and precious metals, agricultural product futures, and the like.

Key components of the invention include a means for gathering individual forecasts from a plurality individuals or other entities within a defined period of time. This defined period of time will depend on the particular metric or value that is being forecast and the time frame in which the market or metric within the market changes. For example, in the NASDAQ stock exchange, for a forecast of closing prices the following day, it would be expected that the individual intelligence inputs would be collected within a time frame measured in no more than hours, and more typically in terms of seconds or minutes. The invention also includes means for filtering and processing these individual forecasts to generate a collective forecast, and a means of communicating the collective forecast back to individuals very quickly. These three components comprise a real-time system for generating accurate quantitative forecasts. It will therefore be appreciated that the time period is more desirably short so that the forecast reflects the current state of the market and in some cases older individual forecasts may be discounted as a function of their age.

The filtering and processing algorithms that receive as inputs the individual intelligence data and output the collective forecast are particularly important. A wide range of algorithms can be used, and are desirably chosen according to the nature of the information that is being forecast. Even with a particular forecasting environment, different algorithms may be applicable to different market conditions. The invention is therefore adapted to permit algorithms to be added and/or modified to improve forecast accuracy and speed under different or changing market conditions.

Auxiliary components, such as procedure, algorithms, additional data, and/or other means for improving the processing algorithms via machine learning techniques may improve the system's overall accuracy over time. Use of the Internet and state-of-art wireless capabilities may increase the number of people who provide forecasts, thus increasing the accuracy of the system. User interfaces which encourage more busy professionals to participate and provide their forecasts may also improve system forecasting performance. The Internet and wireless technologies (particularly from thin client devices such as PDAs and cellular telephones) also allow the system to receive individual forecasts and the generated collective forecasts to be communicated to a large number of people simultaneously, and to be updated in real-time or substantially in real-time.

In one particular aspect, the invention further provides a multiple line ticker, which can display several related types of information at once. Specifically, in one embodiment this multi-line ticker displays both the current values of certain types of information and forecasted values of the same types of information at some future date. In the embodiment directed to stock market price predictions, it displays the current price of a stock and the forecast price of the same stock at some arbitrary time (for example 24 hours or at the close of the next trading day) in the future.

Having now described some of the theory, advantages, and operation, attention is now directed to exemplary embodiments of the system, method, computer program and computer program product of the invention. It is further noted that the inventive method is advantageously implemented as a software or firmware computer program having a plurality of executable instructions for execution within a processor and associated memory of a general purpose computer. For example, such computer program software may execute within a computer configured and connected to a network such as the Internet (or an Intranet) as a server.

Figure 1:
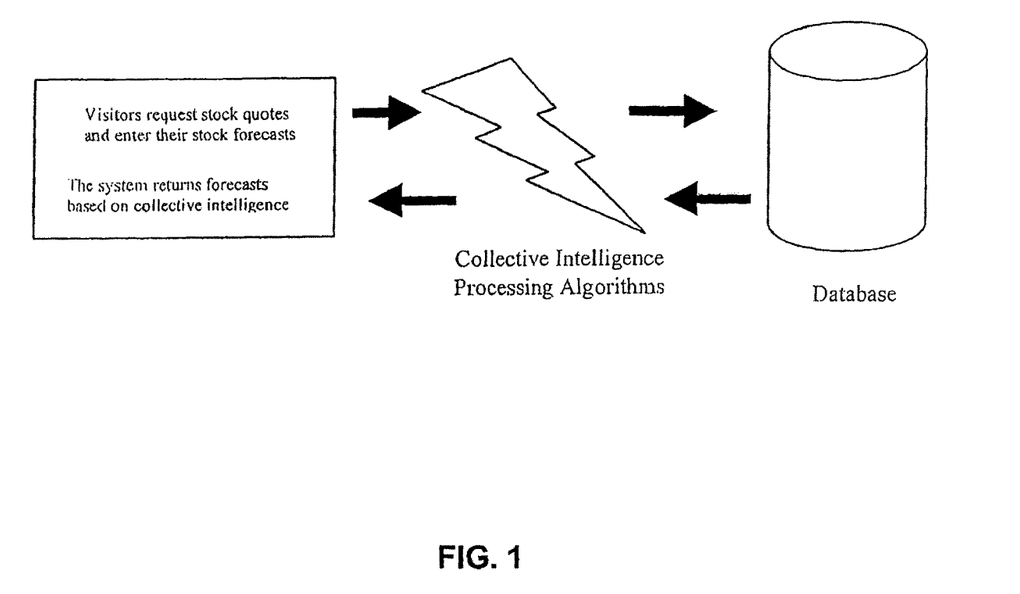
FIG. 1 is a diagrammatic illustration showing an embodiment of a basic system architecture of the invention.

With reference to FIG. 1, an exemplary embodiment of the basic system architecture is now described. A simple form of the system consists of a website, a database, and proprietary information processing algorithms. Conventional network infrastructure, such as the Internet (or Intranet or VPN) infrastructure may be utilized along with any supported web access device such as a user workstation, computer, personal data assistant (PDA), cellular or conventional telephone, or other information appliance or access device.

Figure 2:
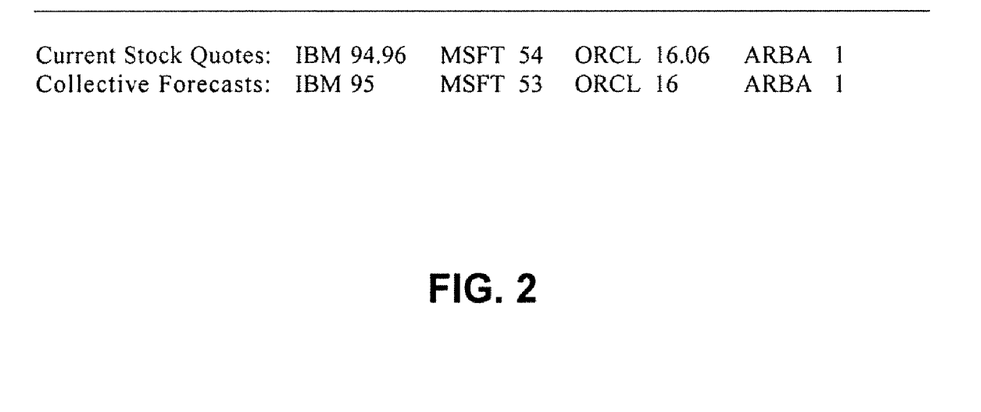
FIG. 2 is a diagrammatic illustration showing an embodiment of a multi-line scrolling ticker displaying the current price and the price forecasted by embodiments of the inventive method for various stocks.
Figure 3:
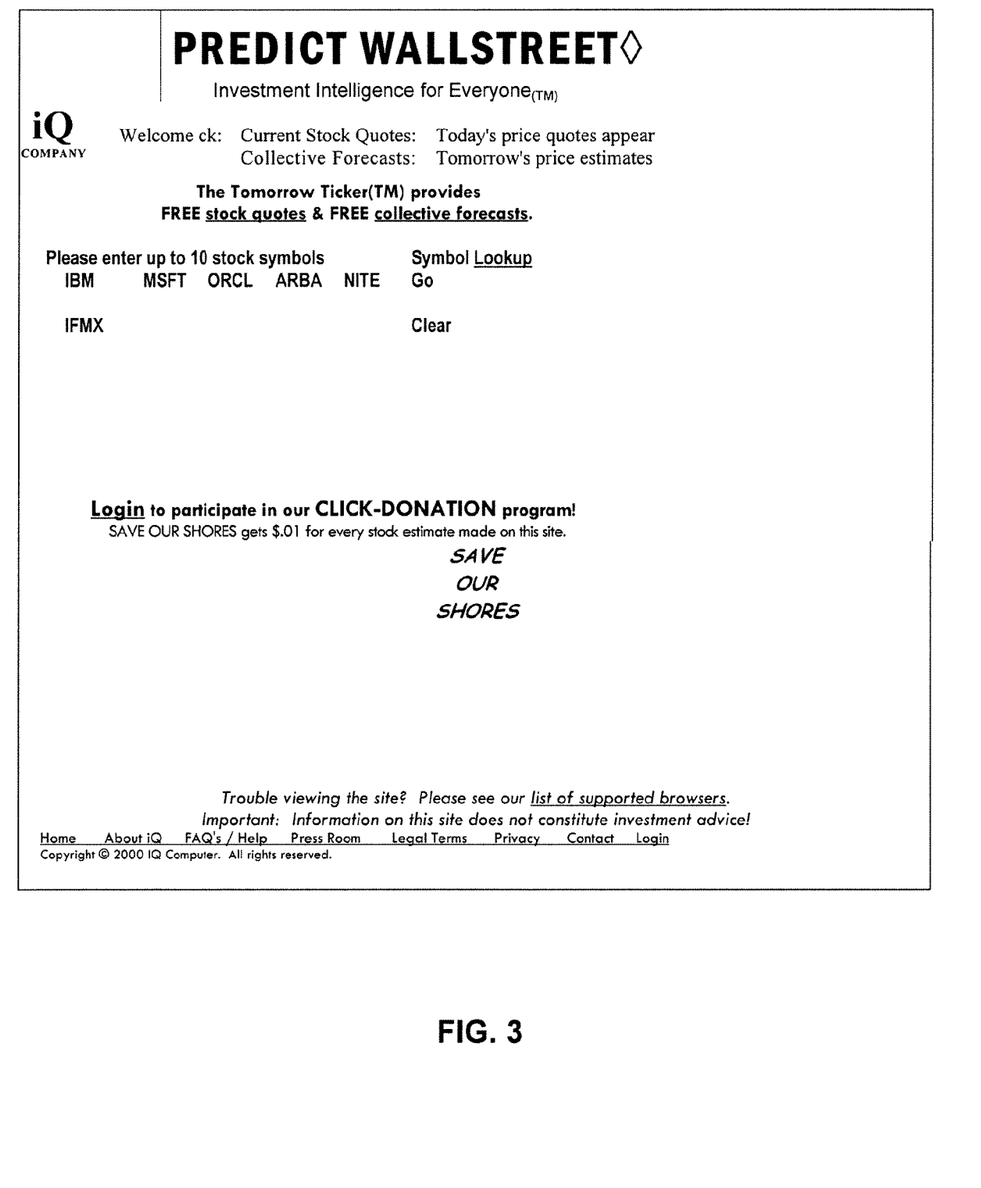
FIG. 3 is a diagrammatic illustration showing an embodiment of a computer screen showing an exemplary display screen where a user requests stock quotations.
Figure 4:
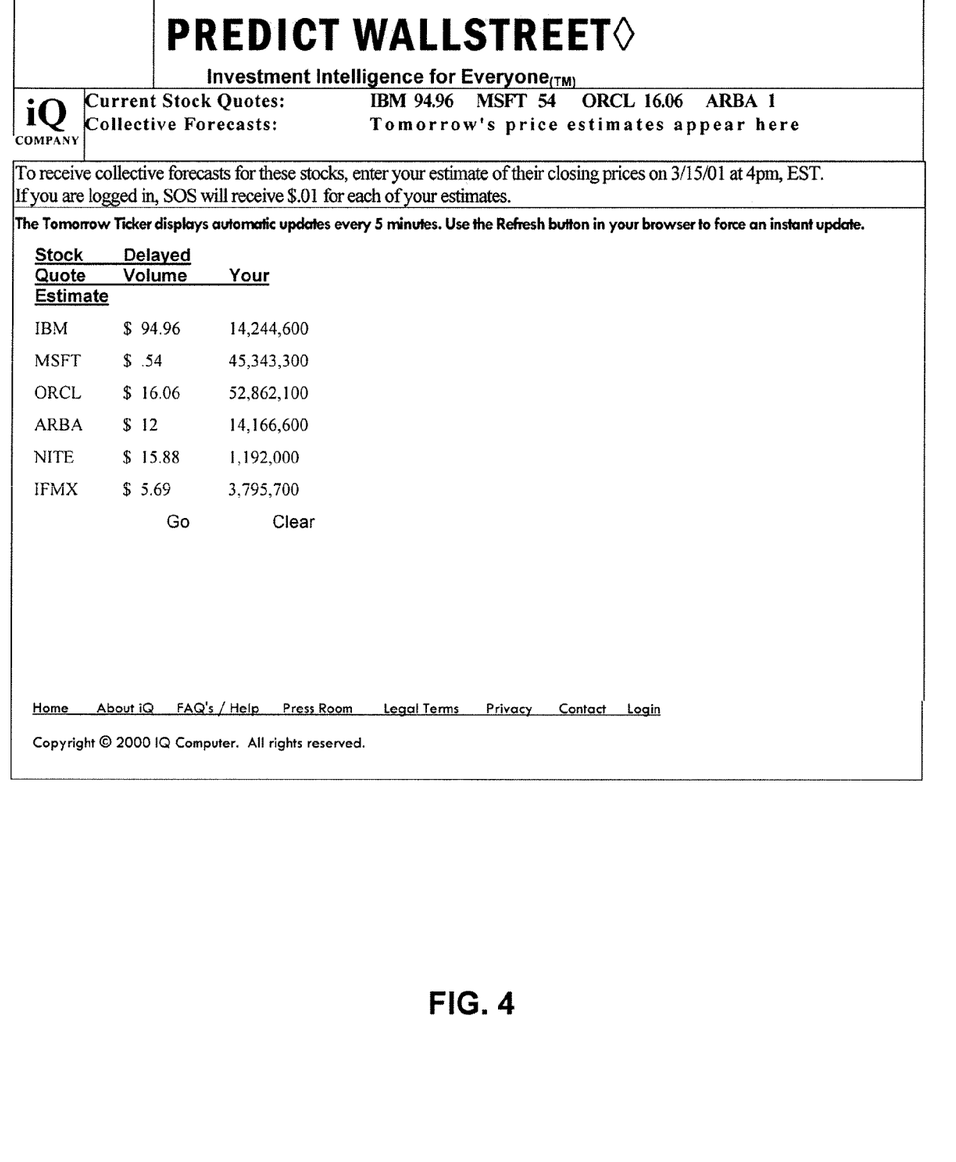
FIG. 4 is a diagrammatic illustration showing an embodiment of a computer screen showing an exemplary display screen where a user enters one or more stock forecasts.
Figure 5:
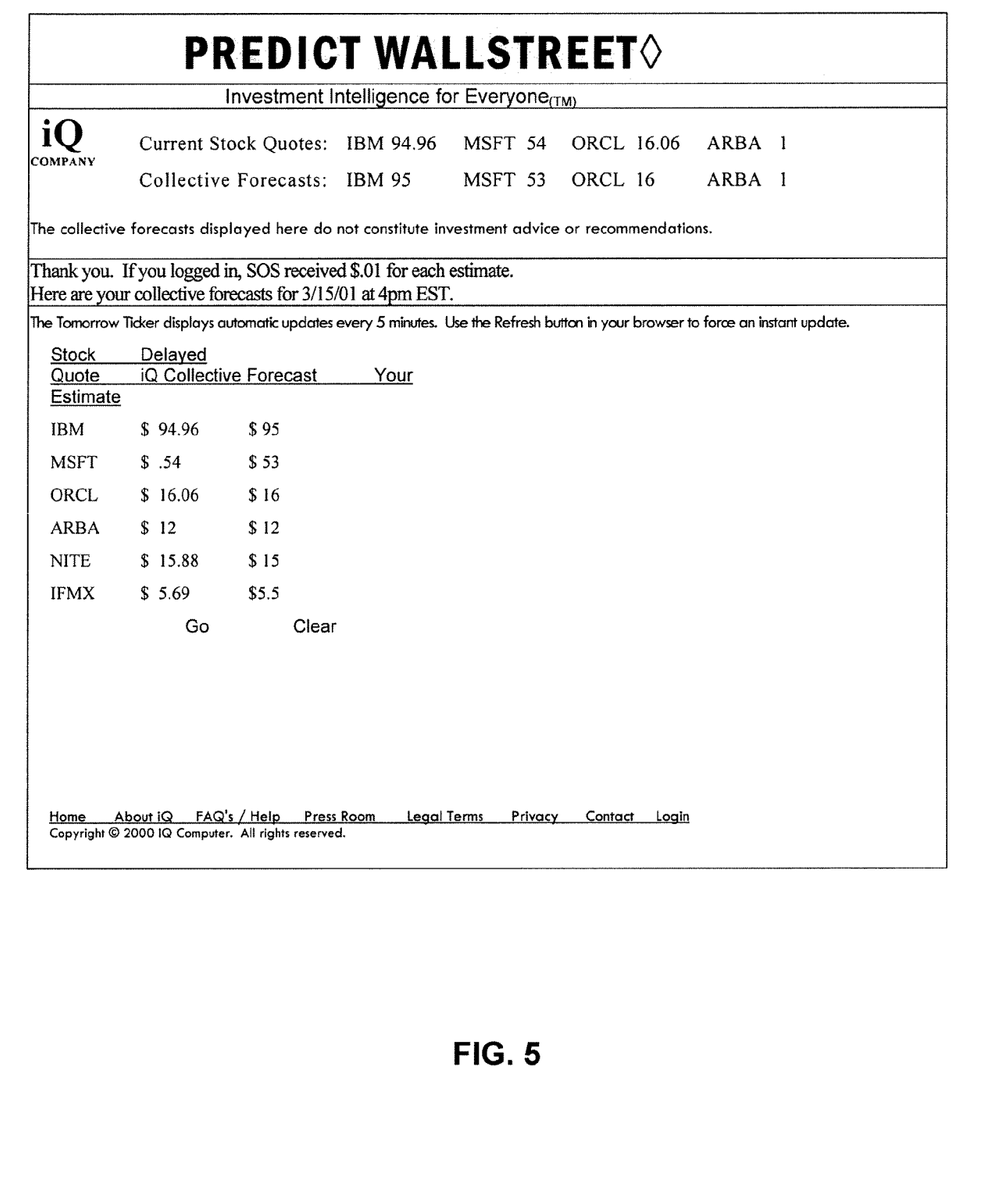
FIG. 5 is a diagrammatic illustration showing an embodiment of a computer screen showing an exemplary display screen where the system display collective stock forecast(s).

Users or visitors 110 access a website 112 over a network such as the Internet 113 to get stock quotes (or other factual information) 114 and (optionally) enter individual stock price estimates (or other individual estimates, forecasts, or predictions) 116. Individual estimates 116 are optionally but desirably filtered or otherwise processed to attempt to neutralize or otherwise prevent possible attempts to manipulate the system or improperly influence the collective forecast, and the individual estimates are then stored in a database 118. Alternatively, the individual estimates may be first stored in some sort of database and later filtered. Collective Intelligence processing algorithms 120 generate system forecasts using the plurality of individual estimates 116, and these collective forecasts are then displayed to the visitors on the website. One of the innovative components of the present system and method is a multi-line scrolling ticker that can display several sources of information simultaneously. For example, FIG. 2 shows how the multi-line scrolling ticker may display the current price and the forecasted price of various stocks.

The inventive system includes a database for storing individual user inputs and predictions, intermediate calculations as required, and collective forecasts. It will also store user prediction histories and other parameters, preferences, and data as described herein elsewhere. In one prototype implementation, Microsoft Access was used to provide a relational database however, other data base products such as Oracle database software made by Oracle Corporation, DB2 made by IBM Corporation., and SQL Server made by Microsoft Corporation may alternatively be used. Database technology is well established and any conventional technique may be used as is known in the art.

An embodiment of the inventive method is now described. This description is followed by a more mathematically rigorous development.

In one embodiment, the input to the collective intelligence calculations are many individual numerical forecasts. The output is a single collective forecast. This single collective forecast could be as simple as an average of all the individual forecasts or may involve other more complex calculations. When the calculation is a simple mean or average, for example, if first user John thinks IBM stock will close the next day at $150/share, second user Sue thinks IBM stock will close the next day at $125/share, and third user Pete thinks IBM will close tomorrow at $100/share, the inventive system and method could simply average all these forecasts and create a collective forecast that IBM will close tomorrow at $125 which is the mathematical mean or average of the three predictions ((150+125+100)/3=125).

This is computation is simplistic, but still may yield acceptable results if the number of individual forecasts is large and if the quality of the forecasts is good. A better approach is to uses a more sophisticated weighted averaging scheme. The reason for this weighted averaging scheme is that we are trying to extract as much useful information from as few individual forecasts as possible.

The simple average treats predictions for the IBM stock price by users John, Sue and Pete equally. It assumes that each individual is equal in his or her ability to forecast the future price of IBM stock. But we know that this is probably not true. Some people know more than others, some people are more diligent that others, and some are simply better at math than others. So we know there will be individual differences in people's ability to forecast stock prices just as there are individual differences in people's abilities to make sound decisions in other matters. The trick is to have a mathematical formula that takes these individual differences into account and makes allowances for them in such a way that the overall system accuracy is improved. A weighted averaging scheme according to one embodiment does this.

Conceptually, the collective intelligence algorithms weight each individual's forecast by a weighting factor (referred to in one embodiment as the WPSE), which reflects how good that individual has been at predicting the particular stock in question. Each individual will have a different WPSE for each different stock that he or she predicts. Over time, the WPSEs are adjusted or updated to reflect how accurate the individual is. Thus the inventive system and method learns how good each individual is at predicting each stock and uses this learning to adjust its overall collective forecasts. This learning is reflected at least in the information stored in the database, and optionally permits selecting and tuning the computational algorithm participating in the generation of collective forecasts. Moreover, the system and method may advantageously compare how accurate each individual is to all the other individual's who are predicting. This is one of the reasons that the more individuals who use the system, the better job the system can do of creating an accurate collective forecast.

Attention is now directed to a particular procedure and algorithm desirably implemented as computer program software executing on a server processor, or distributed among a plurality of processors. Key variables and parameters are first defined and then an exemplary algorithm is described using these variables and parameters. This example is directed toward a system and method that receive as inputs individual estimates for the closing price of a stock and generate the collective forecast for the closing price of that same stock. Note that although closing prices are used in the example, the logic can easily be extended to apply to prices at any given point in time.

The Last Estimated Closing Price (LECP) is the last estimate that an individual user entered for a given stock on a day. The Actual Closing Price (ACP) is the actual closing price for a stock at the close of the market (e.g. 4:00 p.m. Eastern Standard Time).

The Prediction Error (PE) expressed as a percentage (%) is the prediction error for a single individual making a single estimate of a single stock and is equal to the absolute value of the difference between the estimated closing price and the actual closing price for that particular stock. The prediction error is therefore equal to the absolute value of the difference between the last estimated closing price and the actual closing price divided by the actual closing price or PE=(ABS(LECP−ACP))/ACP. The prediction error is normalized by the actual closing price so as to provide some equalization between the weight or influence of high-priced and low-priced stocks.

The Prediction Stock Error (PSE) is equal to the average of the Prediction Errors ($PE_1$, $PE_2$, . . . , $PE_n$) for a single individual on a single stock over the entire period that individual has been making predictions about that particular stock. If $PE_1$ is the error of the first estimate the individual made for a given stock and $PE_n$ is the error of the last estimate the individual made for the stock, then the prediction stock error is the average of the individual prediction errors or: PSE=AVG($PE_1$ . . . $PE_n$).

Having now computed the Prediction Stock Error (PSE) for each particular individuals for a particular stock ($PSE_1$, $PSE_2$, . . . , $PSE_n$,) it is now possible to compute an Average Prediction Stock Error (APSE) which is equal to the average of all the Prediction Stock Errors ($PSE_1$, $PSE_2$, . . . , $PSE_n$,) for a particular stock. Note that the Prediction Stock Error is itself an average, so this is really an average of individual averages. If $PSE_1$ is the average error for individual 1, and $PSE_n$ is the average error of the last individual who has made predictions for the stock, then the average prediction stock error is: APSE=AVG($PSE_1$ . . . $PSE_n$).

Advantageously weights are applied so that the weight applied to each individuals predictions may be adjusted according to some metric associated with or attributed to that individual's demonstrated historical skill in accurate prediction. A Weighted Prediction Stock Error (WPSE) is therefore defined that is equal to the Average Prediction Stock Error (APSE) divided by the Prediction Stock Error (PSE). Basically this means that we use a weight, the ratio of how much error everyone has at predicting a given stock (the average prediction error), compared to how much error a particular individual is doing at predicting a given stock. If the individual has a low error, relative to the group error, then the weight give to that individual's prediction is large; and if the individual has high error relative to the group, than the weight given to that individual is small. (In one embodiment, where the individual appears to have consistently large error or appears to be merely guessing or entering predictions that have not connection to reality, the weight given to that individual's prediction may be very small or even zero. Mathematically: the weighted prediction stock error is give by the expression WPSE=APSE/PSE, where PSE is the average of an individual's prediction errors on a particular stock, as described above and APSE is the average prediction error on that same stock across all individuals, as defined above. In one embodiment, as a practical matter relating to the computational precision on computers, this expression is used when PSE>0.01 (or some arbitrarily small non-zero number), and if the PSE<0.01 (or some arbitrarily small non-zero number), the value of PSE is set to PSE=0.01 (or some arbitrarily small non-zero number) to avoid any potential division by zero problems. Other techniques for minimizing the risk of a divide by zero are known in the art and may alternatively be applied to the computation.

The Consensus Prediction for the Stock (CPS), also referred to here as the Collective Forecast for a stock, is the result of multiplying each individual prediction for a stock by the weighted prediction stock error (WPSE) for the individual who made the prediction. Then the results of all these multiplications are summed and divided by the number of total predictions for the stock. If $P_1$ is the first prediction made for a stock in a given time period, and $P_n$ is the last prediction made for the stock in a given time period, and $WPSE_n$ is the WPSE of the person making $P_n$, then the Consensus Prediction for the stock is given by the expression: CPS=(($WPSE_1*P_1$)+($WPSE_2*P_2$)+ . . . ($WPSE_n*P_n$))/$\Sigma WPSE_{1 \ldots n}$. Note that if no WPSE exists for a individual, then in one embodiment, the AWPSE (average WPSE) for that individual is used, if no AWPSE exists, then the APSE for that stock is used; and if no APSE exists then some predetermined arbitrary weight may be used, for example a weight of 0.5, or 1.0 may be used. Usually, a somewhat conservative weighting may be desirable to avoid giving too much weight under somewhat uncertain conditions.

Finally, the Average System Error (ASE) is simply the average of all the APSEs in the system, that is ASE=AVG($PE_{1 \ldots n}$), where 1 . . . n refers to all PEs for all individuals. The ASE is useful for determining the overall accuracy of the system. Various techniques may be employed in attempt to reduce the ASE.

Having described an embodiment of the procedure and algorithm particularized for generating a collective forecast for stock prices, it will be appreciated that this or an analogous procedure and algorithm may be applied to other quantitative forecasts for other items. The quantitative forecasts find particular application to forecasting financial information such as stock and bond prices, stock index values, interest rates, international currencies, gold and precious metals, agricultural product futures, and the like. They may also be used to fore inventory and sales, such as sales and prices of automobiles, homes, commercial and residential rental/lease rates, and all other manner if goods and services. The quantitative forecasts may also be used to derive qualitative forecasts and assist in decision making. For example, the quantitative predictions may be used to derive qualitative indicators and make decisions, such as for example generating a "buy", "sell", or "hold" recommendation for a stock.

The Last Estimated Closing Price (LECP) described above relative to stocks may be generalized to an Estimated Value (EV) for the item, that is the EV is the individual user's estimate for the item entered for a given value at a specified time. Note that different Estimated Values may be estimated for different times by the same user, for example, $EV(t=t_1)$, $EV(t=t_2), \ldots, EV(t=t_n)$.

The Actual Closing Price (ACP) described above relative to stocks may be generalized to an Actual Value (AV) which is the value for the item at the time or other specified condition. For example, the actual value may be recorded for each hour of the day, the actual value at the closer of normal trading, the value set by a regulatory agency or financial organization, or any other value which is susceptible to prior prediction and then has a value that can be measured or recorded.

The Prediction Error (PE) described above relative to stocks may be generalized to the prediction error for a single individual making a single estimate of the item and is equal to the absolute value of the difference between the estimated value (EV) and the actual value (AV). The prediction error is therefore equal to the absolute value of the difference between the estimated value (EV) and the actual value (AV) divided by the actual value or $PE=(ABS(EV-AV))/AV$. It is noted that as the absolute value is taken, the order of EV and AV in the numerator may be reversed. Furthermore, if it is desired to separately or differently handle over-estimates and under-estimates, the absolute value operation may be eliminated.

The Prediction Item Error (PIE) described above relative to stocks may be generalized to be equal to the average of the Prediction Errors $(PE_1, PE_2, \ldots, PE_n)$ for a single individual on a single item over the entire period that individual has been making predictions about that particular item. If $PE_1$ is the error of the first estimate the individual made for a given item and $PE_n$ is the error of the last estimate the individual made for the same item, then the prediction item error is the average of the individual prediction errors or: $PIE=AVG(PE_1 \ldots PE_n)$.

As before, once the Prediction Item Error (PIE) for each particular individual for a particular item $(PIE_1, PIE_2, \ldots, PIE_n,)$ it is now possible to compute an Average Prediction Item Error (APIE) which is equal to the average of all the Prediction Item Errors $(PIE_1, PIE_2, \ldots, PIE_n,)$ for a particular item who's value is being forecast. Note that the Prediction Item Error is itself an average, so this is really an average of individual averages. If $PIE_1$ is the average error for individual 1, and $PIE_n$ is the average error of the last individual who has made predictions for the item, then the average prediction item error is: $APIE=AVG(PIE_1 \ldots PIE_n)$.

Weights may advantageously be applied and a Weighted Prediction Item Error (WPIE) is therefore defined that is equal to the Average Prediction Item Error (APIE) divided by the Prediction Item Error (PIE). The rationale and manner in which these weightings are applied is analogous to that described for the stock price prediction procedure. Mathematically: the weighted prediction item error is given by the expression $WPIE=APIE/PIE$, where PIE is the Prediction Item Error as described above.

The Consensus Prediction for the Item (CPI), also referred to here as the Collective Forecast for an item, is the result of multiplying each individual prediction for an item by the weighted prediction item error (WPIE) for the individual who made the prediction. Then the results of all these multiplications are summed and divided by the number of total predictions for the item. If $P_1$ is the first prediction made for an item at a give condition or time, and $P_n$ is the last prediction made for the item at the same given condition or time, and $WPIE_n$ is the WPIE of the person making $P_n$, then the Consensus Prediction for the stock is given by the expression: $CPI=((WPIE_1 \times P_1)+(WPIE_2 \times P_2)+ \ldots +(WPIE_n \times P_n))/\Sigma WPIE_{1 \ldots n}$. Note that as before, if no WPIE exists for a individual, then in one embodiment, the AWPIE (average WPIE) for that individual is used, if no AWPIE exists, then the APIE for that item is used; and if no APIE exists then some predetermined arbitrary weight may be used, for example a weight of 0.5, or 1.0 may be used. Again, usually, a somewhat conservative weighting may be desirable to avoid giving too much weight under somewhat uncertain conditions.

Finally, the Average System Error (ASE) is simply the average of all the APIEs in the system, that is $AIE=AVG(PE_{1 \ldots n})$, where 1 . . . n refers to all PEs for all individuals. This is for every prediction in the system, that is, for all items. The ASE is used as a measure of the overall accuracy of the system. Various techniques can then be applied in an effort to reduce the ASE and thus increase the overall accuracy of the system.

Combining these expressions by successive substitution gives one overall but more complex expression as follows:

Beginning with the expression: $CPI=((WPIE_1 \times P_1)+(WPIE_2 \times P_2)+ \ldots +(WPIE_n \times P_n))/\Sigma WPIE_{1 \ldots n}$, we first substitute for each WPIE to yield the expression:

$$CPI=(((APIE/PI)_1 \times P_1)+((APIE/PI)_2 \times P_2)+ \ldots +((APIE/PI)_n \times P_n))/\Sigma(APIE/PI)_{1 \ldots n}.$$

Next, we substitute for each occurrence of APIE to yield the expression:

$$CPI=(((AVG(PIE_1 \ldots PIE_n)/PI)_1 \times P_1)+ \\ ((AVG(PIE_1 \ldots PIE_n)/PI)_2 \times P_2)+ \ldots +((AVG \\ (PIE_1 \ldots PIE_n)/PI)_n \times P_n))/\Sigma(AVG(PIE_1 \ldots \\ PIE_n)/PI)_{1 \ldots n}.$$

Then, we substitute for each occurrence of PIE to yield the expression:

$$CPI=(((AVG(\{AVG(PE_1 \ldots PE_n)\}_1 \ldots \{AVG(PE_1 \ldots \\ PE_n)\}_n)/PI)_1 \times P_1)+((AVG(\{AVG(PE_1 \ldots \\ PE_n)\}_1 \ldots \{AVG(PE_1 \ldots PE_n)\}_n)/PI)_2 \times \\ P_2)+ \ldots +((AVG(\{AVG(PE_1 \ldots \\ PE_n)\}_1 \ldots \{AVG(PE_1 \ldots PE_n)\}_n)/PI)_n \times P_n))/\Sigma \\ (AVG(PIE_1 \ldots PIE_n)/PI)_{1 \ldots n}.$$

So that the combined expression has the following form:

$$CPI=(((AVG(\{AVG([(ABS(EV-AV))/AV]_1 \ldots [(ABS \\ (EV-AV))/AV]_n)\}_1 \ldots \{AVG([ABS(EV-AV))/ \\ AV]_1 \ldots [(ABS(EV-AV))/AV]_n)\}_n)/PI)_1 \times P_1)+ \\ ((AVG(\{AVG([(ABS(EV-AV))/AV]_1 \ldots [(ABS \\ (EV-AV))/AV]_n)\}_1 \ldots \{AVG([(ABS(EV-AV))/ \\ AV]_1 \ldots [(ABS(EV-AV))/AV]_n)\}_n)/PI)_2 \times \\ P_2)+ \ldots +((AVG(\{AVG([(ABS(EV-AV))/ \\ AV]_1 \ldots [(ABS(EV-AV))/AV]_n)\}_1 \ldots \{AVG \\ ([(ABS(EV-AV))/AV]_1 \ldots [(ABS(EV-AV))/ \\ AV]_n)\}_n)/PI)_n \times P_n))/\Sigma(AVG(PIE_1 \ldots \\ PIE_n)/PI)_{1 \ldots n}.$$

where EV is the estimated value for individual predictors and AV is the actual value of the predicted value.

It will be appreciated in light of the description provided here that the invention is not limited to this particular mathematical procedure or formulation of the mathematical procedure. By way of illustration but not of limitation, the method may be altered in various ways yet maintain the inventive concept. No or different weighting schemes may be used. Operations other than averaging or mean value may be used in place of the averages used in the afore described formulation. Various statistical measures may optionally be incorporated. Different functional or parametric relationships may be applied for different types of forecasts or predictions. The computation may be modified according to the number of individual predictions forming a collective prediction.

In another aspect, the invention provides various business operating models. For example, the invention provides a business operating model or method for a subscription or pay-per-quote type operation. Revenue is generated by quote subscription fees and/or pay-per-quote fees. For example, customers pay a monthly subscription fee in order to access a certain number of collective forecasts each month. Alternatively, customers might pay a small fee for each collective forecast they request.

In order to motivate customers to participate by providing their individual forecasts, credit might be given for each individual forecast a customer enters into the system. The amount of credit might for example vary depending upon the quality of the information submitted. Higher quality information would be deemed more valuable and would receive greater credit. Higher quality information may generally be information which ultimately proves to be accurate prediction information. Customers might use their credit to pay for collective forecasts. If a customer's credits were exhausted, then that customer would begin paying actual money for information. Customer credit might also be exchanged for prizes or cash. Profit could be made by charging more for the processed collective information than was paid out to the individual providers of information.

Note that this business model described above is quite general and is not limited to systems that forecast stock prices—or even systems that do forecasting of any sort. The general idea is to pay (credits) for information and then charge more for the processed information than one paid for the raw (unprocessed) information. The added value comes from the processing of the information—which may involve combining information from many individual sources in order to produce more reliable or useful information. Just as a steel factory takes in iron ore and produce more valuable steel by processing the raw material, so too can a collective intelligence system take in raw information, process and combine it with other information, and produce much more valuable information which can be sold back to the individuals who provided the raw material.

Another embodiment of the invention provides a second business model, specific to the use of the inventive system and/or method with wireless devices. The inventive system and/or method is licensed to providers of wireless services. For example, cellular phone service providers (GTE, Cellular One, Verizon, Cingular, AT&T, Sprint, and the like), the Palm Pilot's wireless service (Palmnet), and paging services (Skytel etc.) all might be interested in licensing the technology. The wireless service providers would probably charge their customers a small fee for using the inventive system and/or method on their cell phone, pager, PDA, or other wireless device. However the wireless service providers would also generate increased revenue based on additional airtime charges.

A third business model depends upon advertising revenues. The tomorrow ticker itself, that is the two line ticker or variant thereof that provides the scrolling ticker with collective forecasts—is similar to a dynamic banner. In addition to providing delayed quote information and forecast information, it may optionally display advertising. The ads scroll—intermixed with the content information—or may be part of the stationary frame in which the content scrolls. Revenue would be generated by advertisers paying for space for placing advertising content in the Tomorrow Ticker. Since the content is dynamic—for example users can choose which stocks they wish to see in the ticker—the ads could be targeted to the particular customers. For example, customers that configure their Tomorrow Ticker to include IBM in the list of scrolling stocks, might see ads from IBM appear when the share price of IBM scrolled by.

A fourth embodiment of a business model according to the invention is to use the inventive system and method, also referred to as the "Tomorrow Ticker Technology", as part of the management of mutual funds or other financial trading entities. In this model, the technology becomes a competitive advantage of the fund or entity and a portion of the profits generated by using the technology might be paid as a licensing fee and/or fund manager's fee.

According to a fifth embodiment of the invention, a business model is provided that uses the capabilities of the inventive Tomorrow Ticker Technology in fields other than financial markets—e.g. inventory control. Here, it is inventory needs that are forecast so that intelligent buy, sell, and pricing decisions may be made. In this case the inventive system and method are technology is licensed to companies for a fee who would then use the technology to reduce their internal costs (e.g. inventory costs).

In addition to providing an inventive system, method, computer program and computer program product, and various business operating models, it should be apparent to workers having ordinary skill in the art in light of the description provided herein that the invention (also referred to as the Tomorrow Ticker Technology) may be applied to forecasting variables related to a wide range of financial and consumer goods and services markets. Examples of such financial applications include, without limitation, bonds, interest rates, real estate prices, mortgage rates, stock options, Treasury bill prices, and currency exchange rates.

Forecasting may also or alternatively include key variables that have significant financial impact such as credit ratings for companies, analyst recommendations, consumer confidence numbers, sales numbers, inventory turnover rate, quality statistics, consumer satisfaction ratings, earnings, and savings rates.

Providing better forecasts for these variables would provide customers with opportunities to make money. For example, if a company's credit was forecast to go up, one could buy bonds in that company now and then sell them for a profit when the company's credit was upgraded. Similarly, good forecasts of inventory turnover, would allow companies to plan better and reduce their inventory, thus reducing costs.

The inventive Tomorrow Ticker Technology may also be applied to a wide range of events that depend upon the behavior of large numbers of people. For example, forecasting traffic patterns, vacation trends, demographic changes, election results, consumer spending patterns, and a wide range of other human behavior patterns, are all applications using the basic inventive system, method, and technology.

In the example of forecasting traffic patterns, people have the option of entering what route they plan to take (or are in the process of taking) via a cell phone, PDA, or other communication device or instrument. The system would combine input from many individuals and project which areas would be most likely to have traffic. The system could return these projections to people together with recommendations to minimize time spent in traffic.

One of the advantages of the inventive approach is that the system is able to provide real-time, continuously updated, forecasts, based on the latest information. Rather than drive to the beach on a sunny day only to find that everyone else had the same idea, you can get a real-time estimate of how many people will be at the beach and 1:35 p.m. today, based on input from hundreds of people. Some of these people will be very accurate at estimating the numbers of beach goers (maybe they are lifeguards). These accurate estimators will get more weight in the system and the "volume" (weight) of their input will be turned up. Other people are less accurate and the "volume" of their input will be turned down. The more accurate estimators receive more credit, which can be used to find out other information that may be of interest—or perhaps exchanged directly for cash and/or prizes.

Having now described some aspects of the invention it will be appreciated by those workers having ordinary skill in the art in light of the description provided herein that the various aspects of the invention may be implemented in many different ways and includes device implementations, system implementations, methods and procedures, computer software and/or firmware programs, computer program application software products, and combinations of these.

In one particular embodiment, the invention provides an information processing system comprising: a server computer having a processor for executing computer instructions and a memory coupled to the processor for storing instructions and data during the processing; a communications link for communicating between the server computer and information appliance client entities external to the server computer, the communication link enabling receipt of first information from a plurality of external entities and for transmitting second information to second entities, the first and second entities may be the same entities or different entities; a data store defining a database for storing the first information and the second information; a computer program having a plurality of executable command instructions and executing in the processor and the memory for generating the second information from at least some of the plurality of the first information; wherein the first information comprising a plurality of individual information items and the second information comprising a processed collective information generated from the plurality of individual information items and having an increased value to the second entities by virtue of the collective contribution and processing applied thereto.

In another particular embodiment, the invention provides a method of generating a collective information for a particular item from a plurality of raw information for that same item, the method comprising: gathering raw information from a plurality of first entities for a particular item; processing the plurality of raw information or informations for the particular item to generate a processed collective information for the item; and communicating the processed collective information to second entities.

In another aspect, the inventive method is implemented as a computer software program executing on one or more computers or information appliances, such as for example on a conventional server computer serving content and providing information or data to client computers or devices over an internet network connection. In such situations, the invention provides a computer program and computer program product for use in conjunction with a computer system, the computer program product comprising a computer readable storage medium and a computer program mechanism embedded therein, the computer program mechanism, including a program module that directs the computer to function in a specified manner, the program module including instructions for generating a collective information for a particular item from a plurality of raw information for that same item, by gathering raw information from a plurality of first entities for a particular item, processing the plurality of raw information or informations for the particular item to generate a processed collective information for the item, and communicating the processed collective information to second entities.

In any of these embodiments, the type of information provided as raw or unprocessed data or input may for example be selected from the set of information consisting of: stock prices, bond prices, real estate prices, interest rates, inventory figures, sales figures, consumer confidence estimates, other financial information, vacation plans, traffic routes, sports scores, election results, election forecasts and polling, predictions of actions by individuals, predictions of actions groups, predictions of actions companies, or predictions of actions nations, battlefield and/or military intelligence, other non-financial information, and combinations thereof.

In addition to the processing algorithm for generating collective forecasts or predictions from individual predictions, forecasts, or inputs, numerous alternative algorithms may be applied either alone or in combination with other algorithms or computations. For example, an algorithm or procedure utilizing a simple average may be used. Alternatively, the procedure for generating the collective information may compute a weighted average of inputs. Such weighted average of inputs may provide that the weighting is based on the accuracy of the entity supplying the information. Alternatively, it may provide that the weighting uses other methods for assigning weights such as the weighted majority algorithm, shifting expert algorithms, or other algorithms known in the art of mathematics, statistics, and/or computer science.

Alternatively, the weighting may be determined by linear regression or other statistical techniques of regression. Furthermore, for any of the afore described weighting schemes, the weighting may incorporate a time factor such that more recent performance counts more heavily than older performance. The weighting may also or alternatively be dynamic so that the system, method, and/or constituent procedures and subsystems change as it learns better ways of weighting in order to minimize the error between forecast information or values and actual information or values.

Alternatively or in addition, metrics, measures, or statistics other than the average such as the median, mode, range, variance, standard deviation, or the use of statistical methods that attempt to determine how likely or unlikely a given event is, including Bayesian analyses, may alternatively be used in procedure for generating the collective information or value from the individual information or informations.

In one embodiment, the inventive system and method advantageously provide means for effectively sampling a population with respect to an information, value, or variable of interest, such as investor sentiment.

In one embodiment, a securities investment decision, such as a stock or bond investment decision, is automatically driven by the forecasts and/or processing of the system.

In one embodiment, an entities input, such as an individual user entity input, is filtered to remove information from people who are attempting to "game" the system, where a determination as to whether an entity is attempting to game the system may be made according to predetermined rules or policies.

In one embodiment, the display of the forecast information takes the form of a scrolling ticker that displays both current values for a given information, value, variable, or other indicia, and future values for the same information, value, variable, or other indicia. In one embodiment the scrolling ticker displays stock prices. In one embodiment, the scrolling ticker displays two or more lines of information.

In one embodiment, the person using the inventive system, method, and/or computer program and viewing the scrolling ticker can customize what appears on the ticker based on the user's own preferences. The customization may include one or more of the size, font, color, or other characteristics of alpha-numeric or other symbolic or textual content, characteristics of any background field or image, class or type of advertising where advertising is provided, speed or direction of scrolling, location of the scrolling ticker on the screen, as well as other features, attributes, or characteristics of the scrolling ticker. For example, the ticker may be sized or resized. The ticker may be configured to display in a vertical orientation or in a horizontal orientation, or in any other orientation. In another embodiment, the ticker is capable of displaying advertisements interspersed with the scrolling content.

In another embodiment, the ticker is stationary with values for items displayed changing over time but not scrolling on the display screen. For example, the advertisement display mechanism is intelligent and recognizes the content of the ticker and displays ads that are deemed most relevant to the content that is currently scrolling. The advertisement(s) to be displayed may be selected based on some set of predetermined or dynamically adaptive rules or policies.

In another embodiment, the ticker is capable of displaying ads in the non-scrolling "frame portion" of the ticker. In this embodiment, the ad display mechanism may also be intelligent and recognizes the content of the ticker and displays ads that are deemed most relevant to the content that is currently scrolling.

In another embodiment, the ticker can display both numeric, alphanumeric, and symbolic information, in which the form or appearance of the display or portions of the display may be altered to indicate some additional information relative to other information. For example, color coding of boldness may be utilized. In one embodiment, a green color is used to display prices (or other attributes) for stocks going up and red color is used to display prices (or other attributes) for stocks going down.

In one embodiment, the ticker can be downloaded to a PC web browser, PDA, cell phone, or other wireless or non-wireless (wired) device as a standalone applet or piece of client computer program code that can communicate with a server to display information dynamically.

In one embodiment, the PDA, cell phone, or other wireless device can also periodically load the latest forecast information into the ticker applet (and operate independently) without continuous connectivity, such as for example via a "hot-synch" or only periodic (or intermittent) connections to the network.

In one embodiment, the system and method provide means for gathering or otherwise acquiring information (including parsing and extracting such information where required) submitted by individual entities and also other information that is available from other entities such as government statistics, corporation reports, securities and exchange commission (SEC) documents and/or filings, and all other manner of information such that the information may be used to produce a value-added or augmented information.

In one embodiment, users and in some instances subscribers receive some form of compensation or credit for providing information to the system. Advantageously, the amount of compensation or credit (if any) id determined in part by the quality of information provided. The quality of the information may for example be determined in part by the accuracy of the information, the timeliness of the information, the number of hours or days in advance that an accurate forecast is made when the information provided is a future forecast, and combinations of these or other quality factors.

In one embodiment, users receiving credit can use their accumulated credits to purchase or otherwise obtain the right to see or otherwise obtain the value-added collective information generated. In one embodiment, the users receiving credit can exchange the credit for prizes, cash, or other good or services. In one embodiment, the information supplied by a plurality of users is processed to generate value-added information that is available for further incorporation or inclusion as input to a larger collective intelligence or global intelligence system and/or method. For example, in one particular embodiment, such a system would have military applications both for military intelligence and for battlefield intelligence. In another embodiment, such a system might provide useful forecasts that could help a more sophisticated collective intelligence system solve problems based on forecast information.

The foregoing description, for purposes of explanation, used specific nomenclature to provide a thorough understanding of the invention. However, it will be apparent to one skilled in the art in light of the description provided herein that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A computer program product for use in conjunction with a computer, the computer program product comprising a computer readable non-transitory storage medium and a computer program mechanism embedded therein and including executable instructions for generating a consensus collective information, the instructions comprising instructions for:

gathering a plurality of raw information contribution inputs in response to a solicitation from a plurality of first entities for a particular item, each raw information contribution input being generated by an external contributor and received over an interactive electronic network; and processing said plurality of raw information contribution inputs to generate a processed consensus collective information for said particular item, said processing including weighting each of each said plurality of raw information inputs by a weighting factor determined according to an objective accuracy measure and aggregating said weighted raw information inputs to generate the processed consensus collective information as an output.

2. A computer program product as in claim 1, further comprising:
communicating said processed consensus collective information to second entities over said interactive electronic network.

3. A computer implemented method comprising:
gathering a plurality of raw information contribution inputs in response to a solicitation from a plurality of first entities for a particular item, each raw information contribution input being generated by an external contributor and received over an interactive electronic network; and
processing said plurality of raw information contribution inputs to generate a processed consensus collective information for said particular item, said processing including weighting each of each said plurality of raw information inputs by a weighting factor determined according to an objective accuracy measure and aggregating said weighted raw information inputs to generate the processed consensus collective information as an output.

4. A method as in claim 3, further comprising:
communicating said processed consensus collective information to second entities over said interactive electronic network.

5. An information processing system comprising:
a computer having a processor for executing computer program instructions and a memory coupled to said processor for storing instructions and data during said executing;
a communications interface coupled with the computer for receiving raw contributed information from a plurality of external contributors and for transmitting consensus collective information to any of said external contributors or to external non-contributors;
a processing unit generating said consensus collective information from at least some of said plurality of raw contributed information;
said raw contributed information comprising a plurality of individual raw contributed information items each generated by an external contributor and received over said communications interface; and
said consensus collective information generated from said plurality of raw contributed information by weighting each of each said individual raw contributed information according to an objective accuracy measure and combining said weighted raw contributed individual information.

6. An information processing system as in claim 5, wherein said processing unit for generating said consensus collective information from at least some of said plurality of first raw contributed information comprises a computer program having a plurality of executable instructions for executing in said processor and memory.

7. A server computer adapted to receive a plurality of raw information contributions inputs over a communications link or network and to generate a consensus collective weighted forecast information, said server comprising:
an interface to said communications link or network for receiving said plurality of raw prediction information contributions and for sending said consensus collective weighted forecast information to external entities;
a processor for executing computer program instructions and a memory coupled to said processor for storing instructions and data during said execution;
a computer program including executable instructions for execution on said server, the computer program comprising a computer readable storage medium and a computer program mechanism embedded therein and including executable instructions for generating a consensus collective information, the instructions comprising instructions for:
(i) gathering a plurality of raw information contribution inputs in response to a solicitation from a plurality of first entities for a particular item, each raw information contribution input being generated by an external contributor and received over an interactive electronic network; and
(ii) processing said plurality of raw information contribution inputs to generate a processed consensus collective information for said particular item, said processing including weighting each of each said plurality of raw information inputs by a weighting factor determined according to an objective accuracy measure and aggregating said weighted raw information inputs to generate the processed consensus collective information as an output.

8. A system comprising:
a solicitation engine generating a solicitation of raw information contribution inputs from a plurality of first external entities for a particular item over an interactive electronic network;
an interface coupled with a database for gathering and storing the plurality of raw information contribution inputs in response to the solicitation; and
a processor for processing said gathered plurality of raw information contribution inputs to generate a processed consensus collective information for said particular item, said processing including:
weighting each of each said plurality of raw information inputs by a weighting factor determined according to an objective accuracy measure; and
aggregating said weighted raw information inputs to generate the processed consensus collective information as an output.

9. The system as in claim 8, wherein the system further includes a server computer adapted to receive the plurality of raw information contributions inputs over an external communications link or network.

10. The system as in claim 9, wherein the system further includes an interface to said external communications link or network for receiving said plurality of raw prediction information contributions and for sending said consensus collective weighted forecast information to external entities.

11. The system as in claim 10, wherein the interface is configured for receiving the raw information contribution inputs from a plurality of geographically diverse client devices.

12. The system as in claim 11, wherein the system further comprises the client devices.

* * * * *